United States Patent
Sano et al.

(10) Patent No.: US 9,446,691 B2
(45) Date of Patent: Sep. 20, 2016

(54) HEADREST WITH UNDER GARNISH FOR VEHICLE SEAT

(71) Applicants: Koji Sano, Wako (JP); Daiga Ito, Wako (JP); Hideo Tobata, Akishima (JP); Takayuki Yoshika, Akishima (JP); Yutaka Sodeno, Akishima (JP)

(72) Inventors: Koji Sano, Wako (JP); Daiga Ito, Wako (JP); Hideo Tobata, Akishima (JP); Takayuki Yoshika, Akishima (JP); Yutaka Sodeno, Akishima (JP)

(73) Assignees: HONDA MOTOR CO., LTD. (JP); TACHI-S CO., LTD. (JP)

( * ) Notice: Subject to any disclaimer, the term of this patent is extended or adjusted under 35 U.S.C. 154(b) by 0 days.

(21) Appl. No.: 14/382,201

(22) PCT Filed: May 20, 2013

(86) PCT No.: PCT/JP2013/063981
§ 371 (c)(1),
(2) Date: Aug. 29, 2014

(87) PCT Pub. No.: WO2013/176094
PCT Pub. Date: Nov. 28, 2013

(65) Prior Publication Data
US 2015/0048664 A1    Feb. 19, 2015

(30) Foreign Application Priority Data

May 25, 2012 (JP) ................. 2012-119524

(51) Int. Cl.
*B60N 2/48* (2006.01)
*A47C 7/38* (2006.01)
*B60N 2/60* (2006.01)

(52) U.S. Cl.
CPC ............ *B60N 2/4808* (2013.01); *A47C 7/38* (2013.01); *B60N 2/48* (2013.01); *B60N 2/4802* (2013.01);
(Continued)

(58) Field of Classification Search
CPC ........ A47C 7/38; B60N 2/48; B60N 2/4855; B60N 2/4858; B60N 2/487; B60N 2/4873; B60N 2002/4897; B60N 2205/20; B60N 2/4808; B60N 2/4814; B60N 2/4817
USPC .................................................. 297/403, 408
See application file for complete search history.

(56) References Cited

U.S. PATENT DOCUMENTS 4,711,494 A * 12/1987 Duvenkamp .......... B60N 2/487
                                                    297/403
4,761,034 A *  8/1988 Saito .................... B60N 2/4852
                                                    297/408

(Continued)

FOREIGN PATENT DOCUMENTS

JP      63-13054    1/1988
JP       4-54256    5/1992

(Continued)

OTHER PUBLICATIONS

International Search Report dated Aug. 20, 2013 issued in corresponding International patent application No. PCT/JP2013/063981.

(Continued)

*Primary Examiner* — David R Dunn
*Assistant Examiner* — Tania Abraham
(74) *Attorney, Agent, or Firm* — Ostrolenk Faber LLP

(57) ABSTRACT

A structure of a headrest mounted on a seat, wherein the headrest has, provided at the bottom surface thereof, an under garnish made of a hard synthetic resin material and wherein a stay of the headrest is partly supported in a holder having a head portion projecting from a top portion of a seat back of the seat, the top portion of the seat back being formed by a foam padding and a trim cover assembly overlaying the foam padding. The under garnish is provided with at least one protruding portion which protrudes downwardly therefrom. This at least one protruding portion is disposed at a location oriented towards a padding provided in the seat back. A degree to which the protruding portion protrudes from the under garnish is greater than a height of the head portion of the holder.

7 Claims, 3 Drawing Sheets

(52) U.S. Cl.
CPC ........... *B60N 2/4817* (2013.01); *B60N 2/6009* (2013.01); *B60N 2002/4897* (2013.01); *B60N 2205/20* (2013.01)

(56) References Cited

U.S. PATENT DOCUMENTS

| | | | | |
|---|---|---|---|---|
| 5,261,726 A * | 11/1993 | Yanagishita | ......... | B60N 2/4805 297/391 |
| 5,967,612 A * | 10/1999 | Takei | ......... | B60N 2/48 297/391 |
| 6,149,233 A * | 11/2000 | Takei | ......... | B60N 2/4847 297/220 |
| 6,527,344 B2 * | 3/2003 | Takei | ......... | B60N 2/58 264/46.6 |
| 7,267,407 B1 * | 9/2007 | Demick | ......... | B60N 2/4814 297/410 |
| 7,284,795 B2 * | 10/2007 | Sato | ......... | B60N 2/4838 297/220 |
| 7,413,253 B2 * | 8/2008 | Karlberg | ......... | B60N 2/4844 297/391 |
| 7,445,289 B2 * | 11/2008 | Neale | ......... | A47C 7/38 297/408 |
| 2007/0164593 A1 * | 7/2007 | Brockman | ......... | B60N 2/4847 297/408 |
| 2008/0211267 A1 * | 9/2008 | Linardi | ......... | B60N 2/4858 297/61 |
| 2010/0072803 A1 * | 3/2010 | Sayama | ......... | B60N 2/4844 297/408 |
| 2010/0244526 A1 * | 9/2010 | Kajimoto | ......... | B60N 2/4808 297/354.1 |
| 2012/0080927 A1 * | 4/2012 | Lohmann | ......... | B60N 2/3009 297/410 |

FOREIGN PATENT DOCUMENTS

| | | |
|---|---|---|
| JP | 2011-218963 | 11/2001 |
| JP | 2004-283287 | 10/2004 |
| JP | 2008-253335 | 10/2008 |
| WO | WO 2008/120671 A1 | 10/2008 |

OTHER PUBLICATIONS

Office Action dated Jan. 26, 2016 issued in corresponding Japanese Patent Application No. 2012-119524 with English translation.
Extended European Search Report and European Search Opinion dated Dec. 11, 2015 in corresponding European Patent Application No. 13794131.6 (5 pages).

* cited by examiner

HEADREST WITH UNDER GARNISH FOR VEHICLE SEAT

CROSS-REFERENCE TO RELATED APPLICATIONS

The present application is a 35 U.S.C. §§371 National Phase conversion of PCT/JP2013/063981, filed May 20, 2013, which claims priority of Japanese Patent Application No. 2012-119524, filed May 20, 2012, the contents of which are incorporated by reference herein. The PCT International Application was published in the Japanese language.

TECHNICAL FIELD

The present invention relates to a seat for use with a vehicle. In particular, the invention is directed to a structure of a headrest having an under garnish provided at the bottom surface thereof, which is so designed to prevent interference of the headrest with the seat.

BACKGROUND ART

Conventionally, a headrest structure of the above-stated kind is disclosed for example in the Japanese Laid-Open Publication No. 2008-253335. According to such publication, as described therein, two stays of a headrest are inserted in two holders provided in a top portion of a seat back of the seat, respectively, wherein the two holders are each made of a hard synthetic resin material and also each have a head portion projecting upwardly from a surface of the top portion of the seat back, such head portion having, provided therein, a lock mechanism operable for adjustably locking and unlocking the stay of headrest in vertical direction to permit vertical adjustment of the headrest relative to the seat back. In the headrest, there is provided a mechanical unit for allowing the headrest itself to be moved in forward and rearward directions. A trim cover assembly forming a part of the headrest is formed in a bag-like three-dimensional configuration having an opened side, and in assembly of the headrest, when affixing the trim cover assembly with the headrest, such opened side of the trim cover assembly is folded and closed at a bottom side of the headrest.

In such structure of headrest, the trim cover assembly covers an entire body of the headrest and also covers the bottom side of the headrest. Therefore, even when the headrest is lowered to a lowest position to the extent that the bottom side thereof keenly contacts the top portion of the seat back, no objectionable noise is generated from therebetween by the virtue of an elastic and pliable property of the trim cover assembly. Further, when the headrest is set at such lowest position, a portion of the trim cover assembly which covers the bottom side of the headrest is actually in contact with the head portions respectively of the afore-said holders. In that case, even when subjected to vibrations of a vehicle or other externally applied forces, it is unlikely that an objectionable noise will be generated from between that portion of the trim cover assembly and the head portions of the holders, considering the elastic property of the trim cover assembly.

PRIOR-ART LITERATURE PATENT-RELATED DOCUMENT

Patent-related Document 1: Laid-Open Patent Publication No. 2008-253335

SUMMARY OF THE INVENTION

Problems to be Solved by the Present Invention

However, as stated above, the trim cover assembly covers the entire surfaces of the headrest including the bottom side of the headrest. Such formation of trim cover assembly inevitably requires the steps of sewing together many pieces of base trim cover materials into a bag-like three-dimensional configuration, which results in a number of time-consuming sewing processes. Moreover, in the bottom portion of the trim cover assembly, holes are formed for: allowing the afore-said headrest stays to be inserted therein, respectively, and therefore a worker is required to insert the headrest stays in such holes, respectively, which raises a problem in slow and inefficient process of mounting the headrest to the seat back.

To solve such problems, the portion of the trim cover assembly, which covers the bottom side of the headrest, may be omitted, and an under garnish made of a hard synthetic resin material, different from the trim cover assembly, may be used to cover that bottom side of headrest. But, if the under garnish is provided to the headrest as such, the headrest must be constructed such that the stays of the headrest may pass movably through the under garnish. In that instance, since the under garnish is made of a hard synthetic resin material and also the afore-said holders mounted on the seat back are made of a hard synthetic resin material, when the headrest is lowered to a lowest position above the seat back where the holders exist, the under garnish comes to a firm contact with the head portions respectively of the holders, with the result that an objectionable noise is generated therefrom at that time. Further, when the headrest is set at such lowest position, the under garnish is kept in contact with the head portions of the holders, and therefore, when subjected to vibrations of a vehicle or other externally applied forces, a friction naturally occurs between the under garnish and the head portions of the holders. Thus, it is possible that an objectionable noise will be generated therefrom.

It is a purpose of the present invention to provide a structure of a headrest which prevents generation of an objectionable noise (a noise of friction) between an under garnish provided to a headrest and a head portion of a holder(s) mounted on a seat back, wherein both of the under garnish and holder(s) are made of a synthetic resin material.

Means for Solving the Problem

In accordance with the present invention, there is provided a structure of a headrest mounted on a seat, wherein the headrest has, provided at the bottom surface thereof, an under garnish made of a hard synthetic resin material, and also has a stay extending downwardly from the under garnish, wherein, in a seat back of the seat, there is provided at least one holder of a hard synthetic resin material, in which the stay of the headrest is to be partly supported, the at least one holder being disposed in a top portion of the seat back and having a head portion which projects upwardly from a surface of the top portion of the seat back, and wherein the structure of said headrest is so designed to prevent interference of the under garnish with the at least one holder, wherein the under garnish is provided with at least one protruding portion which protrudes downwardly therefrom, the at least one protruding portion being disposed at a location oriented towards a padding provided in the seat back, and a degree to which the at least one protruding portion (5) protrudes from the under garnish is greater than a height of the at least one head portion of the at least one holder.

In the above-described structure of headrest designed to prevent interference of the under garish with the holder(s), the under garnish is provided with the protruding portion(s) which protrudes/protrude downwardly therefrom and a degree of protrusion of such protruding portion(s) from the under garnish is greater than a height of the head portion(s) of the holder(s). By the virtue thereof, even when the headrest is lowered to the lowest position, the protruding portion(s) of the under garnish is/are first brought to contact with the top portion of the seat back, so that the under garnish does not interfere with the head portion(s) of the holder(s). This arrangement insures to prevent contact between the under garnish of the headrest and the head portion(s) of the holder(s) made of a resin material disposed on the seat back, and therefore prevents generation of objectionable noise from therebetween. In addition thereto, no friction occurs between the under garnish and the head portion(s) of the holder(s), even when subjected to vibrations of a vehicle or other externally applied forces, thereby preventing generation of an objectionable noise therefrom.

Furthermore, in the present invention, the top portion of the seat back, which will be contacted by the under garnish when lowering the headrest to the lowest position, is formed by a foam padding and a surface cover element covering the foam padding. Hence, even when the aforesaid at least one protruding portion of the under garnish is kept in contact with the top potion of the seat back, the elastic property of such seat back's top portion effectively reduces or avoids generation of an objectionable noise (a noise of friction) between the at least one protruding portion and the top portion of the seat back.

Additionally, the integral formation of at least one protruding portion in the under garnish is effective in increasing the strength and rigidity of the under garnish itself, so that the under garnish can hardly be twisted and is therefore protected against deformation.

Still further, the at least one protruding portion is provided in the under garnish so as to be disposed between a pair of left and right portions of the stay of the headrest. Due to such arrangement, when the headrest is lowered to the lowest position, the at least one protruding portion is brought to contact upon the top of the seat back, whereby the headrest is not inclined in anyone of the left and right sides of the seat back, thus preventing contact of the under garnish with the two left and right head portions respectively of the holders. Also, due to such disposition of the at least one protruding portion, a user can readily gain access to the operating knob of the lock mechanism from the outside, wherein the operating knob is provided to the head portion of the holder, and therefore the user can unlock the stays smoothly, since those protruding portions of the under garnish are situated at a point where they do not interfere with the operating knob.

Effects of the Invention

According to the present invention, it is therefore possible to prevent an objectionable noise (a noise of friction) which will be generated from between the under garnish of the headrest and the head portion(s) of the holder(s) mounted on the seat back.

MODE FOR CARRYING OUT THE INVENTION

Hereinafter, with reference to the drawings, a specific description will be made of a structure of headrest for preventing interference of headrest with holders in accordance with the present invention.

Figure 1:
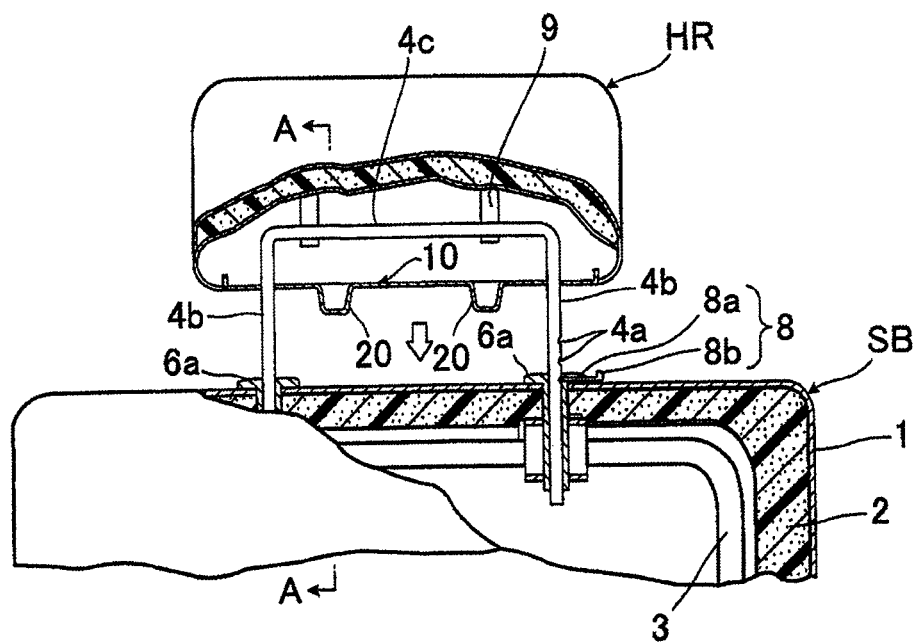
FIG. 1: A sectional view showing one exemplary mode of a structure of headrest designed to prevent interference of an under garnish with a holder.
Figure 2:
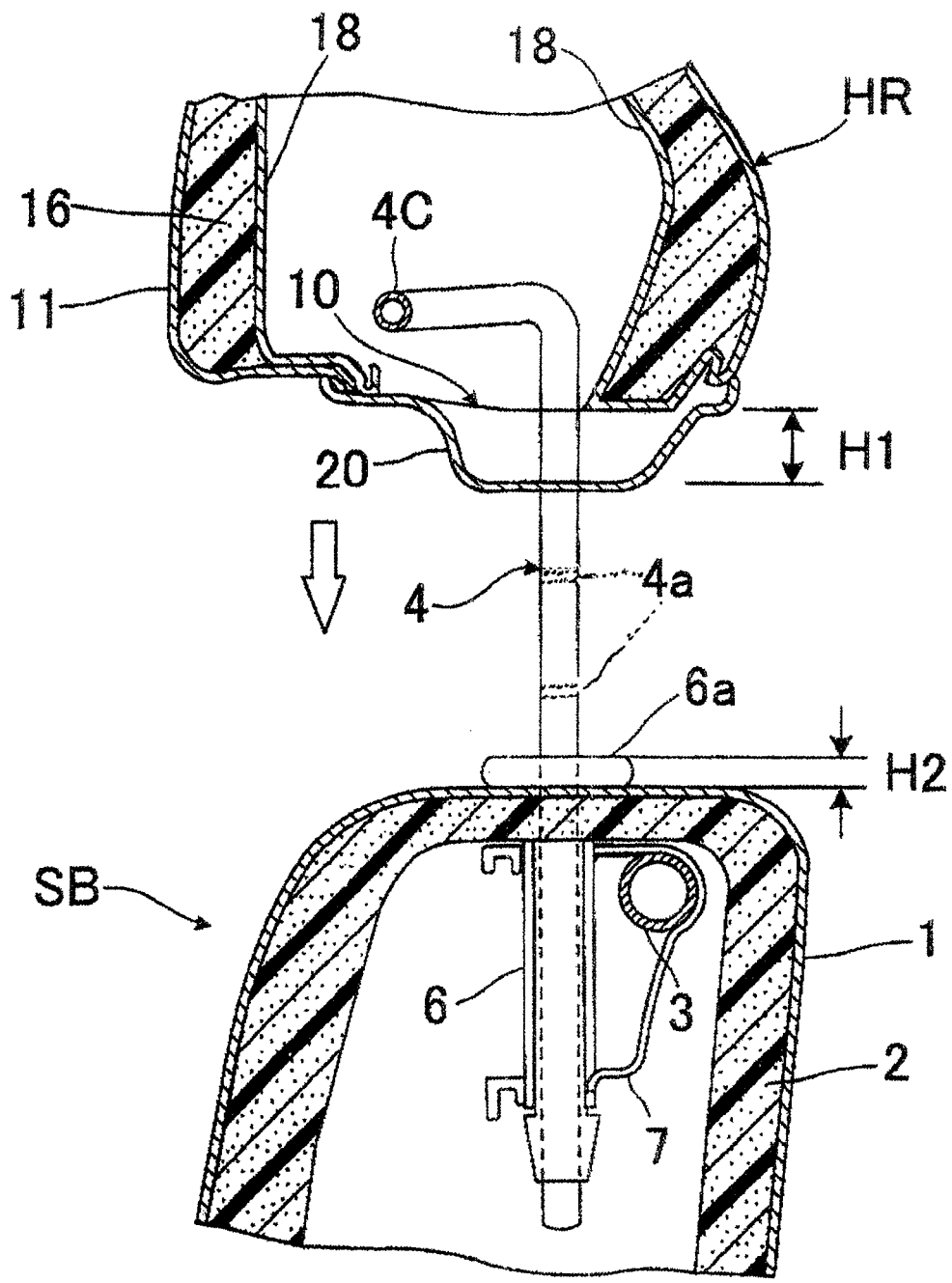
FIG. 2: A sectional view taken along the line A-A in the FIG. 1.

As shown in FIGS. 1 and 2, a seat back SB comprises: a trim cover assembly 1 covering the entire surfaces thereof; and a foam padding 2 fixedly provided therein, wherein an inner surface of the trim cover assembly is attached to the foam padding. A frame 3 is provided within the seat back SB, and holders 6 adapted for supporting stays 4f of the headrest HR, respectively, are fixedly mounted to the frame 3 via brackets 7, wherein the holders 6 are each formed in a cylindrical shape and made of a hard material, such as a hard synthetic resin material.

The holders 6 are arranged in the seat back SB so as to be disposed on the left and right sides of the top portion of the seat back, respectively, such that the holders penetrate the padding 2 and trim cover assembly 1. Head portions 6a respectively of the holders 6 project upwardly from a surface of the top portion of the seat back SB. One of the holders 6 is equipped, at its head portion 6a, with an unlocking portion 8 operable for permitting vertical adjustment of the stay 4 in the holder. This lock mechanism 8 has a lock control lever 8a which is normally biased by a spring to a locked position, but movable slidingly in a horizontal direction relative to the holder.

An operating knob 8b is formed in an outer end of the afore-said lock control lever 8a. The operating knob 8b is shown as being located at a position where it is accessible from the outside. Also, the operating knob 8b has an end portion that faces inwardly of the holder and extends into the inside of the head portion 6a of the holder. A plurality of horizontally extending notches 4a are formed in the vertically extending body of the stay 4 of the headrest HR in such a manner as to be spaced apart from one another. The afore-said inwardly-facing end portion of the operating knob 8b is biased by a biasing force of a spring into engagement with one of the notches 4a, thereby retaining the stay 4 in a locked state at a given position. When moving such operating knob 8b slidingly against the biasing force of the spring, the operating knob is disengaged from the notch, so that the stay 4 is released from the locked state, thereby allowing the headrest HR to be freely movable in vertical direction.

The stay 4, removably mounted to the seat back SB, is formed in a substantially U-shaped configuration having a pair of left- and right-side vertical axis portions 4b and a transverse axis portion 4c connected between those two vertical axis portions 4b. The transverse axis portion 4c of the stay 4 is fixedly attached to the frame 9 provided in the headrest HR. The two vertical axis portions 4b of the stay are shown as passing through an under garnish 10 disposed on the bottom surface of the headrest HR and being exposed externally of the headrest. The under garnish 10 is formed from a plate material having a hard property, such as a hard synthetic resin material, which is likely to allow generation of an objectionable noise therefrom upon its being contacted with other hard element.

Peripheral end portions of the under garnish 10 are fixedly connected to and along an edge of an opened portion of a surface cover element 11 formed in a three-dimensional shape similar to a bag having an opened side. Hence, the surface cover element 11 and under garnish 10 in the aggregate constitute an entire outer surface of the headrest HR. In this regard, provision of the under garnish 10 eliminates the steps of forming a whole closed three-dimensional body of conventional surface cover element which has been complicated in structure, and further serves to retain the shape of the surface cover element against deformation.

Figure 3:
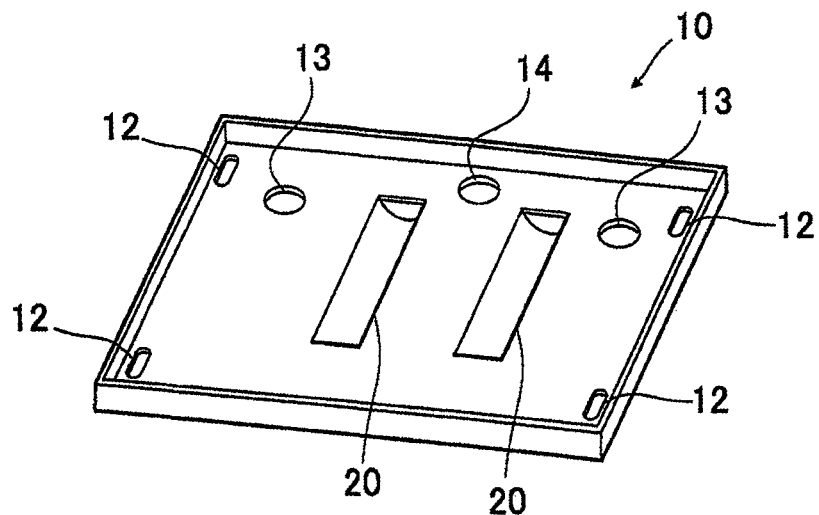
FIG. 3: A perspective view showing an under garnish.

As shown in FIG. 3, the under garnish 10, formed substantially in a plate shape, has projections 12 formed respectively in the four corner regions thereof, wherein such projections constitute connecting portions to which are securely connected the aforementioned edge of the opened portion of the surface cover element 11 and a lower end of a housing 18. Also, formed in the under garnish 10 are two stay insertion holes 13 adapted for allowing insertion therethrough of the respective two vertical axis portions 4b of the stay 4, such that the stay insertion holes 13 are disposed on the left and right sides of the under garnish, respectively. Further, in the under garnish 10, a nozzle insertion hole 14 is formed, which allows insertion therein of a nozzle adapted for injecting a liquid foaming agent therethrough into the inside of the headrest HR.

During assembly of the headrest, the nozzle is inserted in the nozzle insertion hole 14 and then a liquid foaming agent is injected via the nozzle into the surface cover element, after which, the liquid foaming agent is cured and expanded between the surface cover element 11 and a housing 18 which is a part of a unit for allowing the headrest HR to be inclined relative to the stay. In that manner, the liquid foaming agent is cured and expanded to create a foam padding 16 within the surface cover element 11.

As shown in FIGS. 1 to 3, a pair of protruding portions 20 are also formed integrally in a central area of the under garnish 10 so as to protrude downwardly therefrom and are shown to be situated at a point where they are oriented towards a padding 2 of the seat back SB. Those two protruding portions 20 extend in forward and rearward directions or in a direction transversely of a length of the under garnish, and are disposed between the left and right stay insertion holes 13. A degree to which each of the two protruding portions 20 protrude from the under garnish is indicated by H1 and greater than a height H2 of each of the head portions 6a of the holder 6.

Figure 4:
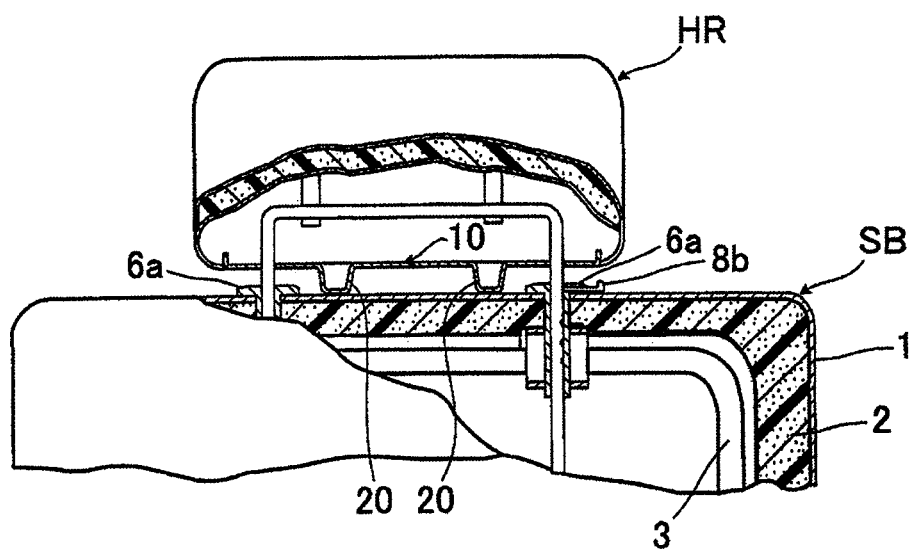
FIG. 4: A sectional view showing a state where a headrest is lowered to a lowest position.

Owing to such height of the protruding portions, as seen in FIG. 4, when the headrest HR is lowered to a lowest position, the under garnish 10 is stopped at a level where it does not contact and interfere with the head portions 6a of the holders 6. This arrangement insures to prevent contact between the under garnish of the headrest and the head portions of the holders made of a hard synthetic resin material disposed on the seat back, and therefore prevents generation of objectionable noise from therebetween.

Further, when the headrest is set at such lowest position, there is no friction between the under garnish 10 of the headrest HR and the head portions 6a of the holders 6, which means that no friction occurs therebetween, even when subjected to vibrations of a vehicle or other externally applied forces. Hence, no objectionable noise of friction is generated therefrom. Furthermore, since the top portion of the seat back SB is formed by the foam padding 2 and the surface cover element 1 overlaying that foam padding, even when the lower ends of the protruding portions 20 of the under garnish 10 are in contact with the top portion of the seat back SB, the elastic property of the top portion of seat back efficiently reduces or avoids generation of objectionable noise (noise of friction) between the protruding portions and the top portion of the seat back. In addition, the integral formation of protruding portions 20 in the under garnish 10 is effective in increasing the strength and rigidity of the under garnish 10 itself, so that the under garnish can hardly be twisted and is therefore protected against deformation.

Moreover, the fact that the two protruding portions 20 are situated between the pair of left and right vertical axis portions 4b of the stay 4 provides the effect that, when the headrest is lowered to the lowest position as stated above, both of the two protruding portions are brought to contact upon the top portion of the seat back, whereby the headrest is not inclined in any one of the left and right sides of the seat back, thus preventing contact of the under garnish with one or both of the two left and right head portions respective of the holders. Also, due to such disposition of the protruding portions, a user can readily gain access to the operating knob 8b of the lock mechanism 8 from the outside, wherein the operating knob is provided to the head portion 6a of the holder 6, and therefore the user can unlock the stays smoothly, since those protruding portions 20 of the under garnish 10 are situated at a point where they do not interfere with the operating knob.

It should be understood as a course of matter that the present invention is not limited to the above-described embodiment. For example, the protruding portions 20 may each be formed in a frusto-conical shape, and may be so formed as to extend in the left- and right-wise directions of the under garnish or in the length-wise direction thereof.

DESCRIPTION OF THE REFERENCE NUMERALS

1 . . . trim cover assembly 2 . . . padding 3 . . . frame 4 . . . stay 4a . . . notches 6 . . . holder 6a . . . head portion of the holder 10 . . . under garnish 11 . . . surface cover element 20 . . . protruding portion H1 . . . a degree to which the protruding portion protrudes H2 . . . height of the head portion of the holder HR . . . headrest SB . . . seat back

The invention claimed is:

1. A structure of a headrest mounted on a seat having a stay extending downwardly from the headrest to a seat back of said seat, the seat having at least one holder made of a hard synthetic resin material, in which said stay of said headrest is partly supported, said at least one holder being disposed in a top portion of said seat back and having a head portion projecting upwardly from a surface of said top portion of said seat back, said structure of said headrest comprising:

an under garnish positioned at a bottom surface of the headrest and configured to prevent interference of the headrest with said at least one holder, said under garnish made of hard synthetic resin material and comprising:

at least one protruding portion having a downward protruding extent, said downward protruding extent positioned to protrude towards a padding provided in said seat back, wherein a length of said downward protruding portion projecting downward from said under garnish is greater than a height of said at least one head portion of said at least one holder, wherein said at least one protruding portion is formed integrally in said under garnish so as to reinforce said under garnish.

2. A structure of a headrest as described in claim 1, wherein said top portion of said seat back, with which said under garnish is to be contacted, is formed by the padding and a surface cover element covering said padding, wherein said padding is made of a foam material.

3. A structure of a headrest as described in claim 1, wherein said at least one protruding portion is provided in said under garnish so as to be disposed between a pair of left and right portions of said stay.

4. A structure of a headrest as described in claim 1, wherein the at least one protruding portion comprises two protruding portions, each protruding portion comprising a respective downward protruding extent, said downward protruding extent protruding toward the padding, and a length of said respective downward protruding portion projecting downward from said under garnish is greater than the height of said at least one head portion.

5. A structure of a headrest as described in claim 1, wherein the under garnish has a longitudinal extent that forms the bottom surface of the headrest and has at least one stay insertion aperture configured to receive the stay extending up from the seatback.

6. A headrest comprising the structure as described in claim 1.

7. A vehicle seat comprising the headrest including the structure as described in claim 1.

* * * * *